United States Patent Office 3,253,016
Patented May 24, 1966

3,253,016
THERMAL ISOMERIZATION OF THE TETRA-
METHYL ESTER OF CIS, TRANS, CIS-1,2,3,4-
CYCLOBUTANETETRACARBOXYLIC ACID
Gary Walter Griffin, New Orleans, La., assignor to
American Cyanamid Company, New York, N.Y., a corporation of Maine
No Drawing. Original application Jan. 9, 1961, Ser. No. 81,224, now Patent No. 3,139,395, dated June 30, 1964. Divided and this application Mar. 12, 1964, Ser. No. 351,519
1 Claim. (Cl. 260—468)

This application is a divisional application of the instant applicant's parent application having the Serial No. 81,224, filed January 9, 1961, now United States Patent 3,139,395, issued June 30, 1964.

This invention relates to a process for the preparation of the tetramethyl ester of trans, trans, trans-1,2,3,4-cyclobutanetetracarboxylic acid comprising thermally isomerizing the tetramethyl ester of cis, trans, cis-1,2,3,4-cyclobutanetetracarboxylic acid by subjecting said cis, trans, cis compound to temperatures between about 200° C. and 400° C. in the absence of a reactive gas.

One of the objects of the present invention is to produce the tetramethyl ester of trans, trans, trans-1,2,3,4-cyclobutanetetracarboxylic acid by a thermal isomerization process. A further object of the present invention is to produce the aforementioned tetramethyl ester by subjecting the cis, trans, cis-1,2,3,4-cyclobutanetetracarboxylic acid to temperatures between about 200° C. and 400° C. in the absence of a reactive gas. These and other objects of the present invention will be discussed in greater detail hereinbelow.

Reference is made to my parent application having the Serial No. 81,224, filed January 9, 1961, and entitled Photodimerization of Fumaric Acid Derivatives, now allowed, of which the instant application is a divisional application.

In order to prepare the cis, trans, cis-1,2,3,4-cyclobutanetetracarboxylic acid, one demethylates the tetramethyl ester of the cis, trans, cis-1,2,3,4-cyclobutanetetracarboxylic acid. The demethylation of this tetramethyl ester may be accomplished by a plurality of known techniques including the acid hydrolysis of said tetramethyl ester. The tetramethyl ester of the cis, trans, cis-1,2,3,4-cyclobutanetetracarboxylic acid is produced by dimerizing dimethyl fumarate. This dimerization step is a novel one and has not previously been known in the prior art nor has any other process for the preparation of the cis, trans, cis tetramethyl ester been disclosed. The production of the tetramethyl ester of the cis, trans, cis-1,2,3,4-cyclobutanetetracarboxylic acid is accomplished by subjecting a solid state layer of dimethyl fumarate directly to light having a wave length between 1750 A. and 4000 A. The dimethyl fumarate may be dissolved in an appropriate solvent such as diethyl ether and a film of the solution of dimethyl fumarate is deposited in a comparatively thin layer on a supporting surface such as a glass plate or on the walls of a glass cylinder or tube and the solvent is then evaporated. The dimethyl fumarate is then in the form of a solid state layer and said layer is then exposed directly to light having a wave length between 1750 A. and 4000 A. The light is applied directly to the solid state layer rather than through the glass support. It is not necessary to utilize glass as the supporting member for the solid state layer as other substrates could readily be utilized but it is preferred that the substrate be hard and substantially non-porous in order to facilitate the collection of the ultimate tetramethyl ester of said carboxylic acid produced.

The tetramethyl ester of trans, trans, trans-1,2,3,4-cyclobutanetetracarboxylic acid is produced by the thermal isomerization of the tetramethyl ester of the cis, trans, cis-1,2,3,4-cyclobutanetetracarboxylic acid. This thermal isomerization is accomplished by subjecting the cis, trans, cis compound to temperatures between about 200° C. and 400° C. in the absence of a reactive gas. Upon the production of the tetramethyl ester of the trans, trans, trans-1,2,3,4-cyclobutanetetracarboxylic acid one can convert said tetramethyl ester to the tetracarboxylic acid by a demethylation step such as that discussed briefly hereinabove to produce the trans, trans, trans-1,2,3,4-cyclobutanetetracarboxylic acid. The tetramethyl ester of trans, trans, trans-1,2,3,4-cyclobutanetetracarboxylic acid can be produced also by heating the tetramethyl ester of cis, trans, cis acid in the presence of sodium methoxide.

In the thermal isomerization of the tetramethyl ester of the cis, trans, cis-1,2,3,4-cyclobutanetetracarboxylic acid to the tetramethyl ester of the trans, trans, trans-1,2,3,4-cyclobutanetetracarboxylic acid, one may utilize temperatures varying between about 200° C. and 400° C. and preferably at about 300° C. Again here, the time interval will vary inversely with the temperature. At the lower temperatures the time interval may be as much as 24 hours or more, whereas at the higher temperature the reaction time may be as little as one hour or less. Over exposure to the elevated temperatures in the thermal isomerization step should be avoided if darkening of the product is observed in the course of reaction. Essentially quantitative yields are experienced in this thermal isomerization reaction.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claim.

*Example 1*

A solution of dimethyl fumarate in methylene chloride is deposited on the inside wall of a glass cylinder. The methylene chloride is evaporated. A Westinghouse 15T8 Germicidal Sterilamp is inserted into the center of the glass cylinder and the outside of the cylinder is cooled with running water. The irradiation is continued for 24 hours and the resulting white solid is scraped from the tube and dissolved in hot benzene. The hot benzene solution is then admixed with activated carcoal and gravity filtered. The filtered solution is then allowed to cool slowly to room temperature, crystallizing therefrom the tetramethyl ester of cis, trans, cis-1,2,3,4-cyclobutanetetracarboxylic acid only. The original starting weight of the dimethyl fumarate was 11 parts and the yield of the tetramethyl ester is 6.5 parts representing a conversion of 59%. The tetramethyl ester of cis, trans, cis-1,2,3,4-cyclobutanetetracarboxylic acid is isolated and is determined to have a melting point of 144–145° C.

*Analysis.*—Cal. for $C_{12}H_{16}O_8$: C, 50.00; H, 5.60. Found: C, 50.28; H, 5.55.

Molecular weight cal. for $C_{12}H_{16}O_8$: 288. Found (Rast): 263.

I.R. determined in KBr: $5.74\mu$ (S), $5.80\mu$ (M), $7.72\mu$ (S), $8.33\mu$ (M), $9.79\mu$ (W), $10.55\mu$ (W), $11.85\mu$ (W), $12.21\mu$ (W).

The nuclear magnetic resonance spectroscopy of the data are also in agreement with the assignment of the cis, trans, cis configuration. The spectrum determined in deuterochloroform shows only two types of protons in the expected ratio of 1:3 with the mass intense peak at $\tau$ equals 6.15 and the other $\tau$ equals 6.20. The position of the latter peak is consistent with the $CH_3$ proton of methyl acetate ($\tau$ equals 6.35). The lack of absorption in the region τ equals 3–4 attests to the absence of vinyl protons.

*Example 2*

A quantity of the tetramethyl ester of cis, trans, cis-1,2,3,4-cyclobutanetetracarboxylic acid prepared according to the process of Example 1 is thermally isomerized by heating the sample at 300° C. in a vacuum or in an inert gas for about 24 hours. The resulting product, purified by sublimation at 80° C. and 0.1 mm. pressure, is identified as the tetramethyl ester of trans, trans, trans-1,2,3,4-cyclobutanetetracarboxylic acid, which had a melting point of 123–125° C.

It has been mentioned hereinabove that the tetracarboxylic acids and their anhydrides of the present invention may be used in the manufacture of alkyd and polyester resins by reacting the same with polyhydric alcohol such as glycerol in the case of alkyd resins or a glycol such as ethylene glycol in the case of polyester resins. These alkyds may also be modified by replacing part of the polyols with monohydric alcohols. The methyl esters of these tetracarboxylic acids can be utilized for the same purposes especially where transesterification between the methyl esters and the polyhydric alcohol is desired. The tetracyano derivatives are useful in the production of guanamines by reacting said tetracyano compound with dicyandiamide. The guanamines thus produced are reactive with aldehydes such as formaldehyde to produce aminoplast resinous compositions.

What is claimed is:

A process for the preparation of the tetramethyl ester of trans, trans, trans-1,2,3,4-cyclobutanetetracarboxylic acid comprising thermally isomerizing the tetramethyl ester of cis, trans, cis-1,2,3,4-cyclobutanetetracarboxylic acid by subjecting said cis, trans, cis compound to temperatures between about 200° C. and 400° C. in the absence of a reactive gas.

No references cited.

LORRAINE A. WEINBERGER, *Primary Examiner.*

DANIEL D. HORWITZ, *Examiner.*

R. K. JACKSON, *Assistant Examiner.*